United States Patent [19]

Girgis

[11] Patent Number: 5,286,562

[45] Date of Patent: Feb. 15, 1994

[54] WEAVABLE TEXTILE GLASS STRAND

[75] Inventor: Mikhail M. Girgis, Wexford, Pa.

[73] Assignee: PPG Industries, Inc., Pittsburgh, Pa.

[21] Appl. No.: 942,482

[22] Filed: Sep. 9, 1992

Related U.S. Application Data

[63] Continuation of Ser. No. 523,150, May 14, 1990, abandoned, which is a continuation-in-part of Ser. No. 278,390, Dec. 1, 1988, abandoned, which is a continuation-in-part of Ser. No. 217,464, Jul. 1, 1988, abandoned.

[51] Int. Cl.$^5$ .................. B32B 9/00; B32B 25/20; D02G 3/00
[52] U.S. Cl. .................. 428/391; 428/375; 428/378; 428/392; 106/287.16
[58] Field of Search ............... 428/391, 325, 378, 392; 106/287.16

[56] References Cited

U.S. PATENT DOCUMENTS

| | | | |
|---|---|---|---|
| 2,323,684 | 7/1943 | Simison | 428/392 X |
| 2,723,215 | 11/1955 | Biefeld et al. | 428/392 X |
| 3,227,192 | 1/1966 | Griffiths | 139/420 |
| 3,249,411 | 5/1966 | McWilliams et al. | 428/392 X |
| 3,265,516 | 8/1966 | Triplett et al. | 106/213 |
| 3,472,682 | 10/1969 | Rammel et al. | 428/392 X |
| 3,746,738 | 7/1973 | Pepe et al. | 528/26 |
| 3,946,132 | 3/1976 | Hedden | 428/391 X |
| 4,233,809 | 11/1980 | Graham | 428/391 X |
| 4,330,444 | 5/1982 | Pollman | 523/404 |
| 4,331,797 | 5/1982 | Martin | 528/26 |
| 4,376,149 | 3/1983 | Martin | 428/266 |
| 4,377,498 | 3/1983 | Temple | 526/202 |
| 4,390,647 | 6/1983 | Girgis | 523/212 |
| 4,397,913 | 8/1983 | Fahey | 428/369 |
| 4,681,805 | 7/1987 | Puckett | 428/378 X |
| 4,795,678 | 1/1989 | Girgis | 428/391 |

Primary Examiner—Patrick J. Ryan
Assistant Examiner—Richard C. Weisberger
Attorney, Agent, or Firm—Kenneth J. Stachel

[57] ABSTRACT

A textile strand weaveable on air jet looms is described which is a unitary bundle of glass fibers having on their surface the dried residue of an aqueous dispersion having at least one wax that is a solid at ambient temperatures and is in a solid-in-water dispersion (emulsion) present in an amount of at least 45 percent and up to around 90 percent of the dispersion, but always as the predominant component of the nonaqueous components of the composition. The dispersion also has on a weight percent basis of the nonaqueous components a cationic lubricant, at least one lubricating material such as high molecular weight polyols, polyalkylene polyols, and glycols wherein each of the lubricating materials are present in an amount less than the amount of the wax. The aqueous dispersion may also have poly(vinylpyrrolidone) and one or more organofunctional alkoxysilane coupling agents or their hydrolysis products.

14 Claims, No Drawings

WEAVABLE TEXTILE GLASS STRAND

This application is a continuation of application Ser. No. 07/523,150, filed May 14, 1990, now abandoned, which is a continuation in part of application Ser. No. 07/278,390, filed Dec. 1, 1988, now abandoned, which is a continuation in part of application Ser. No. 07/217,464, filed Jul. 1, 1988, now abandoned.

The present invention relates to a chemical treatment suitable for use in preparing a bundle of fibers or strands to be used in textile applications. More particularly, the present invention relates to a weaveable glass fiber textile strand that is weaveable in a similar fashion to that of the conventional starch-oil treated glass fiber strands, but without the presence of the starch.

BACKGROUND OF THE INVENTION

Starch containing sizes and starch oil mixtures in particular have been utilized extensively in the glass fiber industry to treat (size) glass fiber strands utilized in textile weaving operations. In general, these textile glass fiber strands have been treated with starch-oil mixtures, dried to leave a starch-oil residue on the fiber after which the strands have been twisted onto bobbins and subsequently used to weave cloth. The cloth woven of the bundle of sized fibers (strands) is typically heat cleaned to remove the size and any other chemical treatments applied in producing the cloth so that the cloth can be dyed, coated or treated before ultimate end use cloth application. In modern loom equipment starch binder materials frequently shed resulting in unsatisfactory levels of broken filaments in the woven cloth. Thus, starch sizes such as shown and described in U.S. Pat. Nos. 3,227,192 and 3,265,156 do not always form satisfactory residue on the glass fibers making up a given textile strand when such strands are being utilized in yarn form as fill yarns in air jet looms. Attempts have been made to provide nonstarch type binders for textile yarn application utilizing glass fibers to form the yarns. While film forming materials such as polyvinylpyrrolidone and carboxylated styrene butadiene copolymers and polyurethane polymers satisfactorily provide film formers that significantly reduce broken filament levels in glass fiber strands over starch-oil mixtures, these are frequently subject to other problems such as binder migration. Further, such nonstarch type binders yield glass fiber yarns that often are found to be unsatisfactory in air jet looms which are much faster than conventional shuttle looms. Frequently such yarns have insertion speeds such that they do not travel completely across the loom before the shed closes which leads to short picks in the cloth. Thus, a need exists for a type glass fiber textile strand which will satisfactorily weave in modern air jet looms and still maintain its stability. The size should also be one which is not subject to excessive migration of the size during drying of the strands and one which will impart low broken filaments to strands of glass fiber textiles during weaving. The ability to be heat or solvent cleanable is also desired. The textile glass fiber strand of the instant invention satisfies these needs.

SUMMARY OF THE INVENTION

In accordance with the invention a weaveable textile glass fiber strand composed of a unitary bundle of a multiplicity of glass fibers or filaments has placed thereon the dried residue of an aqueous chemical treatment which contains on a weight basis at least 45 percent of at least one wax that is a solid at ambient temperatures and is in a solid-in-liquid dispersion or emulsion. Both the dispersion and the emulsion are hereinafter referred to in this disclosure and in the claims collectively as "dispersion". The amount of the wax dispersion is always the predominant component of the nonaqueous components of the composition. In addition to the wax dispersion, at least two lubricating materials are present, and one is a cationic lubricant and the other can be a high molecular weight polyol, polyalkylene polyol, and/or a polyalkylene glycol. The amount of each of the lubricating materials is less than the amount of the wax on a weight percent basis of the nonaqueous components of the chemical treatment. The aqueous chemical treatment is hereinafter referred to as "size". Also the size may have poly(vinylpyrrolidone) and/or one or more organofunctional alkoxysilane coupling agents and/or the hydrolysis products of the silane.

The dried residue of the size is one that results from drying the bundle or strand of plurality of fibers having the aqueous size at a temperature at or below the melting temperature of the wax.

Glass fiber strands sized with this material and subsequently dried to provide the residue of such size on the filaments are found to be excellent yarns from the standpoint of having little or no broken filaments during weaving. The yarns also have acceptable loom insertion times such that they are easily processed in modern air jet looms.

DETAILED DESCRIPTION OF THE INVENTION

In practicing the instant invention an aqueous binder composition (size) is provided in order to size the glass fiber textile strands of the instant invention prior to drying them to place the residue on the glass filaments which form the novel strands.

The major ingredient of the size composition utilized to size the glass fiber filaments forming the textile strands of the instant invention is a wax, where the wax is a solid at ambient temperatures, i.e. 17 to 23 degrees Celsius. At ambient temperatures the wax is preferably present in a solid-in-water dispersion. Most preferably the wax has a melting point of around 120 degrees F or more. A nonexclusive example of a suitable wax is a petroleum wax, and as used herein petroleum wax is intended to cover saturated hydrocarbon mixtures obtained by refining crude waxes from petroleums and is meant to include paraffins and microcrystalline waxes. The paraffin waxes are generally solid materials formed from mixtures of saturated straight chain hydrocarbons obtained from refining waxy distillates derived from parafinic crude oils. Microcrystalline waxes generally are solid hydrocarbon mixtures refined by deoiling crude petroleum obtained from the dewaxing of residual lubricating oil stocks and tank bottom waxes. In the preferred embodiment of the instant invention microcrystalline waxes are the materials that are employed and in particular a material called Polymekon manufactured by the Petrolite Corporation, Tulsa, Oklahoma, which is sold in the form of 40 percent solid dispersion has been found particularly useful. Another useful commercially available wax is that available from Mobil Chemical Company under the trade designation of Mobilcer Q microcrystalline wax. This material is an acid type aqueous emulsion of microcrystalline wax, where the wax has a melting point of 160 degrees F, and where the emulsion has average particle size of 2 microns and a solids content of 50.0 percent by weight and an emulsion density of 7.9 and a pH of 6.8. Additional nonexclusive examples include: vegetable waxes, such as carnauba, Japan bayberry, candelilla and the like, animal waxes such as bees wax, Chinese wax, hydrogenated sperm oil wax and the like; mineral waxes such as ozocerite montan, ceresin and the like; and synthetic waxes such as polyalkylenes like polyethylenes,, polyethyleneglycols, polyethylene esters, chloronaphthalenes, sorbitals, Polychlorotrifluoroethylenes and mixtures and blends of any number of these waxes.

The amount of the wax present in the size is an amount to give a range of at least 45 weight percent of the solids of the size up to around 90 weight percent or more. The amount is from around 50 and preferably 60 to an upper limit of around 80 to 85 weight percent of the Size. It is believed but the invention is not limited by this believe that the presence of this amount of this type of wax provides the fiber with a coating comprised of a plurality of solid particles.

One type of lubricant that is present in the size is a cationic lubricant such as amidated polyamine lubricant or an alkyl amine imidazoline reaction product of a polyalkylene pentamine and stearic acid. Suitable examples of partially amidated polyamines are the Emery materials. These are partially amidated polyalkylene imines such as the reaction product of mixtures of $C_2$ to about $C_{18}$ fatty acids with a polyethylene imine having a molecular weight of about 1200. These reaction products have a residual imine value of about 300 to about 400 and may be used as they are or in diluted form. Preferably the fatty acid amidating acid is pelargonic acid. The materials hereinabove manufactured by Emery Industries, Cincinnati, Ohio, under the trade designation Emery 6717 and Emery 6760 which is a 50 percent active version of the 6717 material. An example of an alkyl imidazoline type cationic lubricant is material sold as Cation X manufactured by Lyndal Chemical Company. The amount of the cationic lubricant present in the size ranges from around 1 to around 20 weight percent of the nonaqueous components of the size. Preferably the amount is from the middle, such as around 7, to the upper portion of the range to reduce the number of broken fibers in processing of the sized strands as yarn and woven product. Most preferably the range is from around 10 to around 18 weight percent. When nonionic surfactants are present in the size or the wax dispersion the amount of the cationic lubricants in the size generally can be reduced.

Another type of lubricant that can be present is a nonionic lubricant like a high molecular weight polyol, polyalkylene polyols, and polyalkylene glycols. Nonexclusive examples of high molecular weight polyols utilized herein are polymers or copolymers of ethylene and propylene oxides containing active hydroxyl groups and having molecular weights in excess of 300, generally between 5,000 and 12,000 and more preferably in the range of 10,000. One particular polyol found useful in practicing the instant invention is Pluracol V10, which is an ethylene-propylene oxide copolymer having active hydroxyl groups and possessing a molecular weight of 10,000, manufactured by BASF-Wyandotte. Carbowax 300 and other Carbowax materials with higher molecular weights than the 300 material manufactured by Union Carbide Corporation can also be useful. The amount of the nonionic lubricant is generally in the range from around 1 to around 30 weight percent of the nonaqueous components of the size. Most preferably the amount is around 5 to around 15 weight percent. The ratio of the cationic lubricant to the polyol ranges from 1 to 99 to 99 to 1.

A component that may be and preferably is present in the size is poly(vinylpyrrolidone) in an amount taken with the lubricating materials is less than the amount of the wax and generally can be in the range of around 0.5 to around 15 or an amount in the range of 1 to 10 weight percent of the nonaqueous components of the size. Nonexclusive examples of suitable poly(vinylpyrrolidone) polymers include: any homopolymer obtained by the addition polymerization of a monomer which may be represented by the formula:

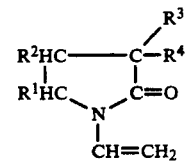

wherein $R^1$, $R^2$, $R^3$, $R^4$ may each be hydrogen or lower alkyls. Examples of such monomers include N-vinyl-2-pyrrolidone, 5-methyl-N-vinyl-2-pyrrolidone, 4-methyl-N-vinyl-2-pyrrolidone, 5-ethyl-N-vinyl-2-pyrrolidone, 4-ethyl-N-vinyl-2-pyrrolidone, 3-methyl-N-vinyl-2-pyrrolidone, 3-ethyl-N-vinyl-2-pyrrolidone, 3,3-dimethyl-N-vinyl-2-pyrrolidone, 3,5-dimethyl-N-vinyl-2-pyrrolidone, and the like. These monomers and their homopolymerization products are known in the art. It is preferred that the polyvinyl pyrrolidone have an average molecular weight of from about 5,000 to 100,000, and it is most preferred that a K-30 polyvinyl pyrrolidone be used. The presence of this polymer provides for improved processability of the sized strand.

Another component that may be and preferably is present in the size is an organofunctional silane coupling agent and/or its monomeric hydrolysis products in an amount in the range of around 0.1 to around 6 weight percent of the nonaqueous components of the size. Suitable silanes include any silane coupling agents known to those skilled in the art of sizing glass fibers. Nonexclusive examples of these include: silylated polyazamides, silylated polyether, epoxy-containing organofunctional silanes, and mixtures of these. Silylated polyazamides are compounds prepared by reacting a functional organic silicon compound or silane with a polyazamide. Silylated polyazamides are generally described in U.S. Pat. No. 3,746,738 and typical silylated polyazamides found useful in the practice of the invention are those available from Union Carbide Corporation, New York City, under the designation Y5987, Y5986, Y5923 and Y5922. It is preferred in the practice of the instant invention to utilize the Y5987 polyazamide silane. The silylated polyether utilized in preparing the emulsifiable sizes of the instant invention copolymer is a material manufactured by Union Carbide Corporation under the designation Y9662, approximate molecular weight of 1800. Other silylated polyethers having molecular weights In the range of 1,000 and above may also be used. An epoxy silane is that available from Union Carbide Corporation under the trade designation of A-187 for gamma-glycidoxypropyltrimethoxysilane with a blend that consists essentially of two or more of the organosilanes, the amounts can be from 1.2 to 2.4 percent of the silylated polyether silane, 1.2 to 12 percent of a silylated polyazamide, and 1.2 to 3 of the epoxy-containing silane or a blend of all three of the silanes.

For example, the size can have 71.7 percent of a microcrystalline wax and an anionic aqueous dispersion, 6.3 percent of a high molecular weight polyol, 4.8 percent cationic lubricant, 4.8 percent poly(vinyl pyrrolidone), and 2.4 percent of a blend of organosilane selected from the group consisting of 33 ⅓ percent of each of the following silanes: silylated polyether silane, epoxy-containing silane, and silylated polyazamide.

For a more complete understanding of the present invention, reference is made to the following examples which illustrate the methods used to prepare the dispersions in accordance with the invention.

EXAMPLE 1

To a mixing tank 30,000 grams of 110° F. water were added. Into this tank 1,800 grams of Pluracol V-10 were introduced and the contents were agitated until the Pluracol V-10 was thoroughly dissolved in the water. In a second mixing tank 15,000 grams of water were added to which was then added 2,160 grams of Emery 6760-U. The contents of this tank were agitated until the Emery dissolved in the water and the contents of this second tank were then added to the first mixing tank. In a separate mixing vessel 7,200 grams of Polymekon SPP-W were added to 15,000 grams of water and mixed thoroughly therein. The resulting mixture was then added to the first mixing tank. In a separate mixing tank 7,500 grams of water were placed and added to the water were 108 grams of Y9662. After the Y9662 was added to the water, 216 grams of Y5987 were then added to the same tank and agitated therein. When sufficiently mixed, the material from this separate mix tank was then added to the main mixing tank. All the ingredients were then thoroughly agitated to provide the final dispersion. All mixing was conducted at room temperature with all ingredients at room temperature. The final dispersion was adjusted to a pH of 5.5 using a 45% solution of glacial acetic acid.

EXAMPLE 2

To a first mixing vessel 30,000 grams of water were added. To this tank 1,680 grams of Pluracol V-10 were then added and the contents of the tank were agitated until all the Pluracol was dissolved in the water. In a separate mixing tank Emery 6760 at a level of 2,016 grams were dissolved in 15,000 grams of water and agitated until dissolved. The contents of this tank were then transferred to the first mixing tank. In a separate mixing tank 8,064 grams of Polymekon SPP-W were mixed with 15,000 grams of water and then added to the first mixing tank. In a separate mixing vessel containing 7,500 grams of water, 102 grams of Y-9662 were added and agitated. After the agitation, 201 grams of Y-5987 were then added and agitated. The entire contents of this separate tank were then transferred to the first mixing tank. All ingredients were added at room temperature and mixed at room temperature and the pH of the final mixture in the first mixing tank was adjusted to a pH of 5.5 using diluted acetic acid, i.e., 45 percent solution of glacial acetic acid.

EXAMPLE 3

To a first mixing tank 30,000 grams of water were added. 11557 grams of Pluracol V-10 were then added to this tank. After addition of the Pluracol, the contents of the tank were agitated until the Pluracol was thoroughly dissolved. In a separate mixing tank 1,869 grams of Emery 6760 were mixed with 15,000 grams of water and agitated until it was thoroughly dissolved. The contents of the second tank were then transferred to the main mixing tank. In a separate mixing tank 8,716 grams of Polymekon SPP-W was mixed with 15,000 grams of water and thoroughly mixed. After complete mixing the contents of this tank were added to the main mixing tank. In a separate mixing tank 7,500 grams of water were placed to which was added 93 grams of Y-9662 and agitated with the water to thoroughly mix therewith. Upon thorough mixing of the 9662, 186 grams of Y-5987 were added and agitated until thorough mixing was accomplished. The contents of this tank were then added to the main mixing tank and all the ingredients thoroughly agitated until the mixture was completely and thoroughly mixed. All binder ingredients and all mixing took place at room temperature and the final mixture was adjusted to a pH at 5.5 utilizing a dilute glacial acetic acid, i.e., 45 percent.

EXAMPLE 4

In a first mixing tank was added 30,000 grams of water to which was then added 1,401 grams of Pluracol V-10. The contents were then thoroughly agitated until all of the Pluracol V-10 had dissolved. In a separate mixing tank 15,000 grams of water were placed and 1,869 grams of Emery-6760-U were added and thoroughly mixed therewith. After thorough mixing the Emery and water were transferred to the first mixing tank. To a separate tank were added 9,588 grams of Polymekon SPP-W with 15,000 grams of water. The ingredients were thoroughly mixed and then added to the first mixing tank. In a separate mixing tank 7,500 grams of water were added, to which were then added 93 grams of Y-9662. After thoroughly mixing 186 grams of Y-5987 were then added to that secondary mix tank and the ingredients thoroughly mixed then transferred to the first mixing tank. All ingredients added during the mixing and all mixing took place at room temperature and the final mixture in the main mixing tank was adjusted to a pH of 5.5 using a 45 percent glacial acetic acid dilute solution.

EXAMPLE 5

In a first mixing tank was added 30,000 grams of hot water (about 150° F.) to which was then added 399 grams of Pluracol V-10. The contents were then thoroughly agitated until all of the Pluracol V-10 had dissolved. In a separate mixing tank 15,000 grams of water were placed and 1,869 grams of Emery-6760-U were added and thoroughly mixed therewith. After thorough mixing the Emery and water were transferred to the first mixing tank. To a separate tank were added 12,099 grams of Polymekon SPP-W with 15,000 grams of water. The ingredients were thoroughly mixed and then added to the first mixing tank. In a separate mixing tank 7,500 grams of water were added, to which were then added 93 grams of Y-9662. After thoroughly mixing 186 grams of Y-5987 were then added to that secondary mix tank and the ingredients thoroughly mixed then transferred to the first mixing tank. All ingredients added during the mixing and all mixing took place at room temperature and the final mixture in the main mixing tank was adjusted to a pH of 5.5 using a 45 percent glacial acetic acid dilute solution.

EXAMPLE 6

In a first mixing tank was added 30,000 grams of hot water (about 150° F.) to which was then added 270 grams of Pluracol V-10. The contents were then thoroughly agitated until all of the Pluracol V-10 had dissolved. In a separate mixing tank 15,000 grams of water were placed and 1,869 grams of Emery-6760-u were added and thoroughly mixed therewith. After thorough mixing the Emery and water were transferred to the first mixing tank. To a separate tank were added 12,654 grams of Polymekon SPP-W with 15,000 grams of water. The ingredients were thoroughly mixed and then added to the first mixing tank. In a separate mixing tank 7,500 grams of water were added, to which were then added 93 grams of Y-9662. After thoroughly mixing 186 grams of Y-5987 were then added to that secondary mix tank and the ingredients thoroughly mixed then transferred to the first mixing tank. All ingredients added during the mixing and all mixing took place at room temperature and the final mixture in the main mixing tank was adjusted to a pH of 5.5 using a 45 percent glacial acetic acid dilute solution.

EXAMPLE 7

In a first mixing tank was added 30,000 grams of hot water (about 150° F.) to which was then added 1,401 grams of Pluracol V-10. The contents were then thoroughly agitated until all of the Pluracol V-10 had dissolved. In a separate mixing tank 15,000 grams of water were placed and 1,869 grams of Emery-6760-U were added and thoroughly mixed therewith. After thorough mixing the Emery and water were transferred to the first mixing tank. To a separate tank were added 11,328 grams of Polymekon SPP-W with 15,000 grams of water. The ingredients were thoroughly mixed and then added to the first mixing tank. In a separate mixing tank 7,500 grams of water were added, to which were then added 93 grams of Y-9662. After thoroughly mixing 186 grams of Y-5987 were then added to that secondary mix tank and the ingredients thoroughly mixed then transferred to the first mixing tank. All ingredients added during the mixing and all mixing took place at room temperature and the final mixture in the main mixing tank was adjusted to a pH of 5.5 using a 45 percent glacial acetic acid dilute solution.

EXAMPLE 8

The sizes prepared in Examples 1–7 were transferred from mixing tanks and pumped through suitable tubing to glass fiber forming level where fiber glass forming bushing were positioned. The bushings used to prepare the strands of the invention were 800 tip 2G-75 bushings having located below each of them a belt applicator in which there was a sump. Rubber belts attached to rollers in the applicator drive the belt through the sump and where it picks up the sizes which are pumped into the sump continuously. The glass fibers are drawn from the bushing and are passed over and in contact with the surface of the rubber belt and the size on the surface of the belt is applied to the filaments as they were drawn over it. The filaments were then gathered into strand form at a gathering shoe and wound on a tubular sleeve placed over the surface of a high speed winder in a conventional manner. The paper tube with the strands collected thereon are subsequently placed in a humidity and temperature controlled environment and conditioned for 8 hours. The strands were then twisted., wound onto bobbins. The conditioning and air drying during twisting provides a dry residue on the surface of the filaments forming the unitary strand. The strands prepared in this manner were then tested in a modified Sulzer-Ruti air jet loom to determine insertion times. Table 1 describes the various yarn properties obtained utilizing the binder ingredients of Examples 1–7 when they were placed on a glass fiber yarns pulled from the 2G-75 bushing and having an average level of size on the yarn of about 1 percent by weight.

TABLE 1

| INGREDIENTS | Example 1 | Example 2 | Example 3 | Example 4 | Example 5 | Example 6 | Example 7 |
|---|---|---|---|---|---|---|---|
| Pluracol V-10 | 29.6% | 27.0% | 24.95% | 21.7% | 6.2% | 4.1% | 12.4% |
| Emery 6760 | 17.8% | 16.2% | 14.95% | 14.5% | 14.5% | 14.5% | 14.5% |
| Polymekon | 47.3% | 51.9% | 55.8% | 59.5% | 73.0% | 77.1% | 68.8% |
| Y-9662 | 1.7% | 1.65% | 1.4% | 1.4% | 1.4% | 1.4% | 1.4% |
| Y-5987 | 3.6% | 3.25% | 2.9% | 2.9% | 2.9% | 2.9% | 2.9% |
| YARN PROPERTIES | | | | | | | |
| Type of Bobbins | 28 | 53 | 28 | 53 | 53 | 53 | 53 |
| BFG BF/1000 Yds. | 1.7 | 7.3 | 2.3 | 2.4 | 1.9 | 3.2 | 4.5 |
| Quill Value (B.F.) | 0.5 | 1.7 | 0.7 | 2.6 | 1.2 | 2.0 | 1.7 |
| Loom Insertion | 63.6 Ms | 67.7 Ms | 67.5 Ms | 63.5 Ms | 59.1 Ms | 58.1 Ms | 60.4 Ms |

As can be readily seen, the bobbins of yarn tested involved a bobbin having an average weight of 8 pounds, identified as 28 bobbin type and those containing 20 pounds identified as 53 bobbin type.

The broken filaments per thousand yards are superior to the average figure of 10 obtained using normal starch-oil binder yarns. The quill value indicating broken filaments is a visual observation and again, is well below the value obtained by the normal starch-oil yarns which is typically an 8. The loom insertion speeds are given in milliseconds and are well within the specification for air jet looms.

While the invention has been described with reference to certain specific examples and illustrative embodiments, it is not intended to be all inclusive and is not to be limited thereby except insofar as appears in the accompanying claims.

I claim:

1. Wound, weaveable and twisted textile glass fiber strand that is a unitary bundle of a multiplicity of glass fibers having thereon the heat or solvent cleanable, dried residue of an aqueous nonstarch, forming size composition that is an aqueous dispersion at ambient temperatures followed by subsequent drying without the addition of other chemical compounds, wherein on a weight basis the aqueous nonstarch, forming size composition, comprises:

at least 45 percent and up to around 90 percent but always as the predominant component of the nonaqueous components of the composition of at least one wax that is a solid at ambient temperatures and is in a solid-in-water dispersion or emulsion and is selected from the group consisting of microcrystalline wax, petroleum wax, and mixtures and blends thereof, and a cationic lubricant and a second lubricating material selected from the group consisting of: with a molecular weight in the range of 300 to 12,000, polyalkylene polyols, and glycols wherein each of the lubricating materials are present in an amount less than the amount of the wax.

2. The textile glass fiber strand of claim 1 wherein the wax content of the composition is in the range of around 60 to around 80 weight percent of the solids.

3. The textile glass fiber strand of claim 1 wherein the wax content of the composition is present in an amount in the range of 50 to 80 weight percent.

4. The textile glass fiber strand of claim 1, wherein said chemical treating composition further comprises at least one organofunctional silane coupling agent in an amount in the range from around 0.1 to around 6 weight percent of the nonaqueous components of the composition.

5. The strand of claim 1 wherein the dried residue on the strand is from an aqueous dispersion wherein, when the wax is present in an amount of 47.3 weight percent of the nonaqueous components, other components of the aqueous dispersion are present in the following amounts based on the weight percent of the nonaqueous components of the dispersion: 29.6 percent of a high molecular weight polyol, 17.8 percent cationic lubricant, 1.7 percent of a silylated polyether silane and 3.6 percent of a silylated polyazamide; and wherein, when the wax is present in an amount of 51.9 weight percent of the nonaqueous components, other components of the aqueous dispersion are present in the following amounts based on the weight percent of the nonaqueous components of the dispersion: 27 percent high molecular weight polyol, 16.2 percent cationic lubricant, 1.69 percent of a silylated polyether silane and 3.21 percent of a silylated polyazamide; and wherein, when the wax is present in an amount of 55.8 weight percent of the nonaqueous components, other components of the aqueous dispersion are present in the following amounts based on the weight percent of the nonaqueous components of the dispersion: 24.9 percent high molecular weight polyol, 14.9 percent cationic lubricant, 1.4 percent silylated polyether silane and 2.9 percent silylated polyazamide; and wherein, when the wax is present in an amount of 59.5 weight percent of the nonaqueous components, other components of the aqueous dispersion are present in the following amounts based on the weight percent of the nonaqueous components of the dispersion: 21.7 percent high molecular weight polyell 14.5 percent cationic lubricant, 1.4 percent silylated polyether silane and 2.9 percent silylated polyazamide; and wherein, when the wax is present in an amount of 73 weight percent of the nonaqueous components, other components of the aqueous dispersion are present in the following amounts based on the weight percent of the nonaqueous components of the dispersion: 6.2 percent high molecular weight polyol, 14.5 percent cationic lubricant, 1.4 percent of a silylated polyether silane and 2.9 percent of a silylated polyazamide; and wherein, when the wax is present in an amount of 77.1 weight percent of the nonaqueous components, other components of the aqueous dispersion are present in the following amounts based on the weight percent of the nonaqueous components of the dispersion: 4.1 percent high molecular weight polyol, 14.5 percent cationic lubricant, 1.4 percent of a silylated polyether silane and 2.9 percent of a silylated polyazamide; and wherein, when the wax is present in an amount of 68.8 weight percent of the nonaqueous components, other components of the aqueous dispersion are present in the following amounts based on the weight percent of the nonaqueous components of the dispersion: 12.4 percent high molecular weight polyol, 14.5 percent cationic lubricant, 1.4 percent of a silylated polyether silane and 2.9 percent of a silylated polyazamide.

6. The textile glass fiber strand of claim 1, wherein said chemical treating composition further comprises poly(vinylpyrrolidone) present in an amount less than the amount of the wax.

7. The textile glass fiber strand of claim 6 wherein the total amount of the lubricating materials and the poly(vinylpyrrolidone) is less than the amount of the wax.

8. The textile glass fiber strand of claim 1, wherein the amounts of the components of the aqueous nonstarch forming size on a dry solids basis are:
    50 to 85 percent of at least one wax;
    around 1 to 20 percent of the cationic lubricant;
    around 1 to 30 weight percent of the polyol wherein the ratio of the cationic lubricant to the polyol ranges from 1 to 99 to 99 to 1; and wherein the forming size includes: up to around 15 percent of polyvinylpyrrolidone, and
    around 0.1 to around 6 percent of silane coupling agent selected from the group consisting of organofunctional alkoxysilanes and their hydrolysis products.

9. Textile glass fiber strand of claim 8 wherein the organosilane coupling agents is selected from the group consisting of silylated polyether silane, epoxy-containing silane and silylated polyazamide and blends and mixtures thereof.

10. Textile glass fiber strand of claim 9 wherein the blend is present that consists essentially of two or more of: 1.2 to 2.4 percent of a silylated polyether silane, 1.2 to 12 percent of a silylated polyazamide, and 1.2 to 3 of the epoxy-containing silane.

11. The textile glass fiber strand of claim 1, wherein the amounts of the components of the aqueous nonstarch forming size on dry solids weight basis are:
    60 to 80 percent was;
    5 to 15 percent of the polyol with a molecular weight in the range of 300 to 12,000;
    7 to 20 percent cationic lubricant, and wherein the aqueous nonstarch forming size includes:
    1 to 10 polyvinylpyrrolidone; and
    up to 5 percent of silane coupling agent selected from the group consisting of organofunctional alkoxysilanes and their hydrolysis products.

12. Textile glass fiber strand of claim 11 wherein the organosilane is selected from the group consisting of silylated polyether silane, epoxy-containing silane, and silylated polyazamide and blends and mixtures thereof, wherein for a blend of all three of the silanes the silanes are present in amounts based on weight percent of the nonaqueous components of the size as follows: silylated polyether silane in the range from 1.2 to 2.4, epoxy-containing silane in the range from 1.2 to 2.4, and the silylated polyazamide in the range from 1.2 to 12.

13. Textile glass fiber strand of claim 11 wherein the dried residue on the strand is from an aqueous dispersion containing 71.7 percent of a microcrystalline wax in an anionic aqueous dispersion, 6.3 percent of a high molecular weight polyol, 14.8 percent cationic lubricant, 4.8 percent poly(vinylpyrrolidone), and 2.4 percent of a blend of organosilanes selected from the group consisting of 33 ⅓ weight percent of each of the following silanes: silylated polyether silane, epoxy-containing silane, and silylated polyazamide.

14. The textile glass fiber strand of claim 1, wherein the aqueous nonstarch forming size consisting essentially of the glass fibers having thereon the dried residue of an aqueous nonstarch forming size that on a weight basis comprises:
- 50 to 80 of at least one wax that is a solid at ambient temperatures and is in the solid-in-water dispersion or emulsion, and
- at least two lubricating materials selected from the group consisting of: a cationic lubricant, a poly with a molecular weight in the range of 300 to 12,000, polyalkylene polyols, and glycols wherein each of the lubricating materials are present in an amount less than the amount of the wax.

* * * * *

UNITED STATES PATENT AND TRADEMARK OFFICE
CERTIFICATE OF CORRECTION

PATENT NO. : 5,286,562

DATED : February 15, 1994

INVENTOR(S) : Mikhail M. Girgis

It is certified that error appears in the above-identified patent and that said Letters Patent is hereby corrected as shown below:

Under "References Cited" on the title page of the patent, the following cited U.S. Patents were not listed:

| | | |
|---|---|---|
| 3,207,623 | 9/65 | Marzocchi, et al. |
| 3,793,065 | 2/74 | Morrison, et al. |
| 3,971,871 | 7/76 | Haynes, et al. |
| 4,286,019 | 8/81 | Fahey |
| 4,470,252 | 9/84 | Brodmann |
| 4,568,612 | 7/87 | Puckett |

Also, the cited foreign references were not listed:

| | | |
|---|---|---|
| DD 251 681 A3 | 1987 | Germany |
| DD 267 483 A1 | 1989 | Germany |
| BE 642 176 | 1964 | Belgium |

UNITED STATES PATENT AND TRADEMARK OFFICE
CERTIFICATE OF CORRECTION

PATENT NO. : 5,286,562
DATED : February 15, 1994
INVENTOR(S) : Mikhail M. Girgis It is certified that error appears in the above-indentified patent and that said Letters Patent is hereby corrected as shown below:

In column 9, line 5, please insert --polyol-- before the word "with".

In column 9, line 57, please correct "polyell" to --polyol--.

In column 10, line 53, please change "was" to --wax--.

In column 12, line 10, please correct "poly" to --polyol--.

Signed and Sealed this

Twenty-fifth Day of October, 1994

Attest:

BRUCE LEHMAN

Attesting Officer     Commissioner of Patents and Trademarks